April 4, 1961
C. G. FERRARI
2,978,331
BREAD IMPROVER COMPOSITIONS AND
METHODS FOR PREPARING THE SAME
Filed June 27, 1958
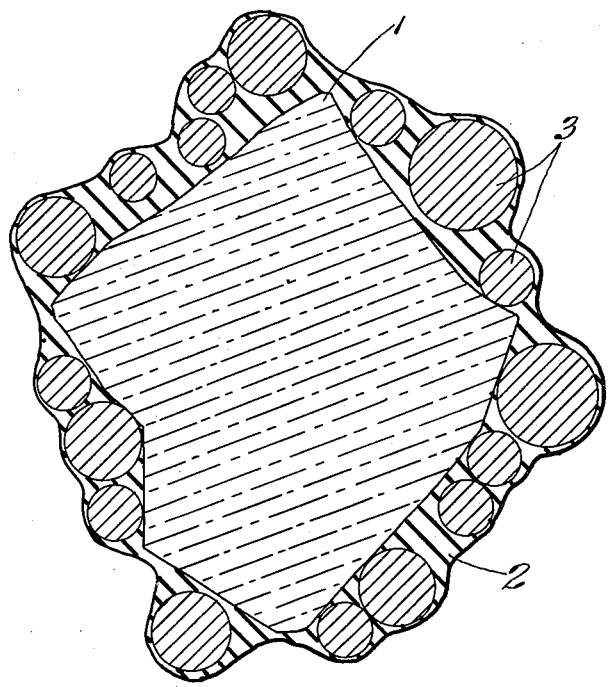
INVENTOR
CHARLES G. FERRARI
BY *D. C. Roylance*
ATTORNEY

United States Patent Office 2,978,331
Patented Apr. 4, 1961

2,978,331

BREAD IMPROVER COMPOSITIONS AND METHODS FOR PREPARING THE SAME

Charles G. Ferrari, Evanston, Ill., assignor to J. R. Short Milling Company, Chicago, Ill., a corporation of Illinois Filed June 27, 1958, Ser. No. 745,123

13 Claims. (Cl. 99—91)

This invention relates to novel bread improvers and to methods for preparing the same.

It has long been common practice in the baking industry to employ, as additives in the dough-forming mixtures from which baked goods are prepared, certain materials capable of acting to produce specific improvements observable either in the dough itself or in the baked goods produced therefrom. Such materials have become known as "bread improvers," this term embracing not only individual agents but also compositions containing more than one active agent.

As fully disclosed in my copending application, Serial No. 744,897, filed concurrently herewith, I have discovered that, by combining certain active bread improver agents with a normally solid, edible protective material capable of being taken up by the liquid phase of a dough during mixing thereof, two important advantages can be attained. The first of these is a delay, and in some cases a controlled progressive release, of the bread improver activity during mixing of the dough to which the bread improver is added, such delay or progressive release resulting in a better bread improver effect. The second advantage is the prevention of certain types of damage caused by such active bread improver agents to the more sensitive bread improver constituents often employed in multi-component bread improved compositions. In this latter regard, I have found that many of the bread improver agents, particularly calcium peroxide and dicalcium phosphate, tend to deactivate the enzymes present in enzymatically active bread improver materials such as the enzymatically active legume flours, and that such deleterious effects can be prevented or minimized by the application of my protective materials to the calcium peroxide, dicalcium phosphate, or equivalent agent.

A general object of the present invention is to provide a particularly advantageous bread improver material of the general type disclosed in my aforementioned copending application.

Another object is to provide such a bread improver material comprising a solid, finely divided bread improver agent which is fully protected by an edible material capable of being taken up by the liquid phase of the dough, such full protection being accomplished without the necessity of separately enveloping the individual particles of the bread improver agent.

Another object of the invention is to devise an improved method for preparing such a bread improver, which method is unusually simple and effective, can be carried out at relatively low cost with conventional equipment, and eliminates or greatly reduces the dusting problems encountered when using extremely finely divided agents, such as calcium peroxide, for example.

In my aforementioned copending application Serial No. 744,897, I have disclosed bread improver compositions wherein the individual particles of a finely divided bread improver agent, such as any of the usual inorganic bread improver compounds, are separately enveloped in a thin film of certain advantageous protective materials. To obtain such a product, the finely divided material is slurried with a solution of the protective material, so that the covering films are deposited on the individual particles. While advantageous in many instances, such a procedure requires special processing equipment not usually available to the producer of bread improver compositions. Also, such a procedure involves the use of solvents which are relatively volatile, requiring careful precautions against fire. In my copending application Serial No. 745,173, I have disclosed another method for preparing bread improver compositions of the general type referred to. In that method, the finely divided bread improver agent is mechanically worked with the protective material, as in a mulling apparatus or in other special mixing equipment, to provide a finished product in which the very small particles of bread improver agent are variously embedded and partially embedded in larger bodies of the protective material. While that process has several advantages, particularly in that it produces a product capable of progressively releasing the bread improver agent during dough mixing, it suffers from the disadvantage that the very fine bread improver agents tend to dust excessively during the mixing operation.

The present invention provides a unique protected bread improver material having very desirable bread improving characteristics, which product can be produced without encountering the difficulties involved in the other two methods just mentioned.

The novel materials of the present invention comprise a particulate, edible carrier material, a finely divided solid bread improver agent and a normally solid protective material capable of being taken up, as by being dissolved or emulsified, by the liquid phase of the dough mixture to which the bread improver material is to be added, the protective material being present as a continuous coating in the carrier particles and the fine particles of bread improver agent being retained and enveloped by such coating. Thus, as seen in the diagrammatic illustration in the single figure of the drawings, my novel materials may be in granular form, each granule consisting of a core particle 1 of any suitable edible carrier material, a continuous coating 2 covering the exposed surface of the core particles, and a plurality of fine particles 3 of a particulate solid bread improver agent.

As will be apparent from the foregoing, the invention may employ as the finely divided bread improver agent indicated at 3 in the drawings, any of a large number of bread improver agents. The most important of these agents are the inorganic bread improver compounds such as calcium peroxide, the phosphates of calcium and ammonium, particularly monocalcium phosphate, dicalcium phosphate, diammonium phosphate and mixtures thereof, the persulfates of calcium, potassium, sodium and ammonium, potassium bromate, potassium iodate, ammonium sulfate, calcium sulfate, ammonium chloride, sodium chlorite, and calcium carbonate.

As the particulate carrier material, indicated at 1 in the drawings, I may employ any suitable particulate, edible solid which can be obtained in the desired particle size and which can be handled by conventional mixing apparatus. A particularly advantageous group of carrier materials are the cereal flours, including especially corn flour and wheat flour, as well as partially dextrinized corn flour. Other typical carrier materials which can be employed include the starches, sugars and salt, and mixtures of such materials.

The protective materials employed to provide the coating indicated at 2 in the drawings are, broadly, the edible, normally solid materials which, while capable of firmly adhering to the particles of carrier material and the fine particles of bread improver agent, are effectively removed therefrom when subjected both to direct contact with aqueous fluids and to mechanical working of the type involved in dough mixing. Particularly advantageous results are obtained when employing, as the protective material, one which is water-emulsifiable. It appears that such advantageous results occur because the emulsifiable materials, even though they be present in the form of a relatively thin coating, are not removed immediately upon contact with the aqueous phase of the dough mixture but rather require a certain amount of mechanical working in order to accomplish good emulsification.

In this connection, I have discovered a highly advantageous class of edible protective materials useful in accordance with the invention, such class consisting of the monoglycerides having an iodine value not exceeding 50, mixed mono- and diglycerides with the mixture having an iodine value not exceeding 50, the tartaric acid esters of mono- and diglycerides having an iodine value not exceeding 50, and normally solid mixtures of such materials with lecithin. Thus, I find glyceryl monostearate, glyceryl monopalmitate and the mixed monoglycerides obtained commercially from lard, vegetable oils and edible fats, such mixtures having an iodine value not in excess of 50, to be excellent protective materials for use in accordance with the invention. Similarly, such monoglyceride esters as the diacetyl tartaric acid ester of glyceryl monostearate are particularly useful. On the other hand, those monoglycerides and glyceride mixtures having iodine values in excess of 50 are unsuitable because of their marked tendency to develop rancidity during storage prior to actual use. In this connection, it is to be noted that, in accordance with the invention, the protective material is employed in direct contact with various chemicals which tend, to a greater or lesser degree, to promote rancidity. Accordingly, such monoglyceride materials as those derived from soybean or cotton seed oil and having an iodine value in excess of 50, as well as those containing substantial proportions of oleic, linoleic, linolenic, or arachidonic acids, for example, are unsuitable. The presence of diglycerides in small quantities is not deleterious, so long as the diglyceride is stable and derived from a fatty acid of such nature that the iodine value of the total glyceride mixture is not in excess of 50.

As has been mentioned earlier, the invention also embraces multi-component bread improver compositions employing, in addition to the specially protected material discussed with reference to the drawings, at least one other bread improver material which is sensitive to contact with the finely divided bread improver agents. Most frequently, such sensitive materials are the various enzymatically active bread improvers, including particularly the enzymatically active materials, capable of both bleaching caratonoids and modifying dough properties, obtained from soybeans, peas, peanuts, beans or lentiles. Such materials may be fat-free, as is the case when the oil content thereof has been extracted with a solvent such as hexane, or may contain all or part of their natural fat content. As more fully discussed in my copending application Serial No. 744,897, filed concurrently herewith, use of the full-fat legume material gives rise to another problem of sensitivity, since many bread improver agents, and particularly the inorganic bread improver compounds, tend to cause such fat content to become rancid. Other sensitive bread improver materials useful in accordance with the invention include the various commercial enzyme preparations, particularly the fungal enzyme concentrates.

Referring again to the drawings for clarity of explanation, I find it advantageous to employ, as the carrier material 1, a material the particles of which are substantially larger than those of the finely divided bread improver agent indicated at 3. Thus, assuming that the finely divided bread improver agent is an inorganic compound having an average particle size substantially smaller than 100 mesh, I find it particularly advantageous to employ as the carrier material a partially dextrinized corn flour, or equivalent cereal product, having an average particle size substantially larger than 100 mesh, say, on the order of 30–80 mesh.

An important function of the carrier material is to provide a very extensive surface area to which the protective material can be adhered, so that the final product can be in free-flowing, relatively non-agglomerated condition even though a large amount of protective material is employed. As will be explained hereinafter in more detail, use of the carrier material also provides distinct process advantages.

In preparing the bread improver materials of the invention, the carrier material is introduced into a heated mixer maintained at a temperature near the melting point of the protective material, the protective material is then added and mixing is carried out until the molten or plastic protective material has been applied as an initial coating to the particles of carrier material. The finely divided bread improver agent and an additional quantity of the protective material are then added and the mixing operation continued, while maintaining the mixture at the same temperature, until all of the finely divided bread improver agent has been taken up by the protective material. As a general proposition, most all of the finely divided bread improver agent introduced to the mixture will be retained by and enveloped in the layers of coating material on the carrier particles. Because of the nature of the mixing operation, a small proportion, rarely more than a few percent, of the finely divided bread improver agent will remain unattached to carrier particles. Such free particles of inorganic bread improver agent will, however, be found to be fully enveloped in the same protective material with which the carrier particles are coated. This procedure has the distinct advantage that, while the finely divided bread improver agent is being introduced to the mixer, and during the following mixing step, there is substantially no dusting of the finely divided material. In other words, because all of the protective material employed in the mixture is in very plastic or even fully molten form, the very fine particles of bread improver agent are quickly trapped and so cannot escape from the mixture to cause a dusting problem.

The protected bread improver material obtained as a result of the process just described can be used alone as a bread improver. In that event, the product is simply blended with a suitable amount of an edible diluent or extender to form a composition which can be proportioned out easily by the baker. The protected material can, on the other hand, be used as a constituent of a multi-component bread improver composition, in which case the protected material and the other active constituent or constituents of the composition are blended with a suitable diluent in the usual fashion.

The relative proportions of the particulate carrier, the protective material, and the finely divided bread improver agent are subject to wide variations, depending upon the nature of the carrier and of the finely divided bread improver agent. In formulating the composition, the basic requirement is that a predetermined amount of the bread improver agent be provided in protected condition. Hence, assuming that the carrier material is one which has no function other than that of a carrier, it is simply necessary to employ an amount of carrier material which will provide the desired surface area. On the other hand, the carrier material may consist of one or more materials intended to have a specific function in the dough mixture to which the finished product is to be added. Thus, it is possible to use as the carrier material a mixture of cereal flour and salt, with the salt content of the product representing all or a portion of the salt to be introduced into the dough. In that event, it is obvious that the relative proportion of salt in the product must be determined in accordance with the requirements of ultimate use. As a general range, the carrier material can be employed in proportions varying from ½ to 3 times the weight of the finely divided bread improver agent which is to be protected, while the protective material can be employed in proportions ranging from 1/10 to ½ times the weight of the finely divided bread improver agent.

While, in certain embodiments of the invention, the protective material 2 may be made up entirely of or consist essentially of one or more of the water-emulsifiable materials hereinbefore defined, it is sometimes useful to employ as a constituent of the protecting coating 2 a highly water soluble material. This feature is important, for example, when the process by which the product is prepared is carried out in such fashion that it is desirable to employ, on the carrier particles, a relatively thick coating of water-emulsifiable material. Of course, if the thickness of the coating is increased, the rate at which the bread improver agent will be released during dough mixing is correspondingly decreased and, in some cases, it therefore becomes desirable to speed up the emulsification of the protective material in the aqueous phase of the dough. As highly water soluble materials, I find it particularly useful to employ the sugar syrups, commercially available corn (glucose) syrup being particularly suitable. The highly water soluble material, such as the sugar syrup, can be incorporated in the coating material at the rate of 5–25% of the weight of the water-emulsifiable material or materials employed. Introduction of the sugar syrup or the like is accomplished with stirring while the protective material is in very plastic or fully molten condition, so that the water soluble material and the water-emulsifiable material form an emulsion, with the latter constituting the continuous phase. The highly water soluble material can be incorporated in the water-emulsifiable protective material before the same is introduced to the mixture, or during the initial mixing phase before the finely divided bread improver agent is added.

The following examples are illustrative of the invention:

*Example 1*

Three hundred parts by weight of partially dextrinized corn flour having an average particle size of about 80 mesh and 50 parts by weight of a distilled monoglyceride product (Myverol Type 18–30, Distillation Products Industries, Rochester, N.Y.) having a minimum monoester content of 90%, an iodine value of 40 and a congealing point of 58° C. were introduced to a water-jacketed mixer maintained at 49–53° C. This temperature maintains the monoglyceride in a condition from a soft plastic to a liquid. The mixer was of the ribbon type, equipped with trowels to supplement the usual ribbon mixer action. Mixing was continued for an initial period of 20 minutes. An additional 50 parts by weight of the monogylceride product, and 300 parts by weight of food grade calcium peroxide (60% $CaO_2$, all finer than 100 mesh, 90% finer than 200 mesh) were then added, and mixing then continued for an additional 20 minutes. The mixture was maintained at 49–53° C. throughout the entire mixing period. After completion of the second 20 minutes of mixing, cold tap water was introduced to the water jacket of the mixer and mixing was continued for an additional 10 minutes to cool the product and congeal the monoglyceride product.

At the end of the first 20 minute mixing period, the monoglyceride product was found to have been distributed, as a coating, on the particles of corn flour. The final product, recovered from the mixer after the cooling step, was found to consist predominantly of composite particles of the nature illustrated in the drawings, with the larger dextrinized corn flour particles being the "core particle" and the calcium peroxide being disposed as indicated at 3. The product also contained a small portion of fully monoglyceride-coated calcium peroxide particles unattached to corn flour particles.

To test for protection of the calcium peroxide, a small sample of the completed product was placed in a beaker of water at room temperature, and it was found that all of the product floated. A few minutes manual stirring with a stirring rod gave no observable sign of contact between the calcium peroxide and water. Stirring at slow speed with a motorized blender for 5 minutes resulted in appearance of only a very slight milkiness in the water. Thus, the calcium peroxide was found to be fully protected and the monoglyceride coating would not emulsify immediately by simple stirring.

Preparatory to test baking, 777 parts by weight of the finished product was blended with an additional 24,223 parts by weight of partially dextrinized corn flour as a diluent or extender to provide test product A. For comparison, a conventional mixture of 333 parts by weight uncoated calcium peroxide (60% $CaO_2$) was blended with 24,667 parts by weight partially dextrinized corn flour to provide control product B.

Two doughs were prepared by the conventional sponge-dough procedure, in accordance with the following formula:

| Sponge | Ingredient | Dough |
| --- | --- | --- |
| 450.0 grams | Flour | 250.0 grams. |
| 275.0 cc | Water | See below. |
| 17.5 grams | Yeast | |
| 2.0 grams | Yeast food | |
| | Milk solids | 21.0 grams. |
| | Salt | 14.0 grams. |
| | Sugar | 35.0 grams. |
| | Lard | 21.0 grams. |

In one dough, test product A of this example, comprising the specially protected calcium peroxide, was added in the dough mixing stage in an amount equal to 0.375% of the total flour weight. In the other dough, the conventionally prepared control product B was added, in the dough mixing stage, in an amount equal to 0.375% of the total flour weight. Both doughs showed the expected drying effect of calcium peroxide, requiring addition, in the dough mixing stage, of a proportion of water greater than would be normally required to produce a dough of proper consistency were calcium peroxide not included. However, such increased water absorption in the dough prepared with test product A was almost half again as much as in the dough prepared with control product B. Such observations indicate not only that the coating, in test product A, was removed from the calcium peroxide during dough mixing, but also that the calcium peroxide of test product A was more effective in the dough than was that of control product B.

Bread was baked from the two doughs in conventional fashion, employing identical conditions for the loaves from each dough, and the baked loaves were compared. To the skilled bread scorer, a greater evidence of calcium peroxide effect was found in the loaves prepared from the dough made with test product A. This was shown by an increased softness, some improvement in volume, and an improvement in grain and texture, as compared to the bread made with control product B.

It will be understood that the procedure of the foregoing example can be repeated with any other solid, finely particulate bread improver agent other than calcium peroxide.

*Example 2*

A specially protected dicalcium phosphate product is prepared in the same manner described for the calcium peroxide product in Example 1. Thus, the protecting method is carried out with 300 parts by weight of partially dextrinized corn flour having an average particle size of about 80 mesh, a total of 100 parts by weight of the monoglyceride product identified in Example 1 and 300 parts by weight of food grade dicalcium phosphate sustantially finer than 100 mesh. The final product is similar to that obtained in Example 1 and illustrated in Fig. 1, except that the fine particles of bread improver agent are particles of dicalcium phosphate.

A multi-component bread improver is prepared by blending the resulting protected dicalcium phosphate material, the protected calcium peroxide material of Example 1, full-fat enzymatically active soy flour and an additional amount of partially dextrinized corn flour, as an extender, in accordance with the following formulation:

| Ingredients | Parts by Weight |
| --- | --- |
| Protected calcium peroxide as per Example 1 | 2.5 |
| Protected dicalcium phosphate | 10.5 |
| Full fat enzymatically active soy flour | 40.0 |
| Partially dextrinized corn flour extender | 147.0 |
|  | 200.0 |

For purposes of storage life tests, an equivalent composition is prepared, using the coresponding amounts of unprotected dicalcium phosphate and calcium peroxide. Storage life tests are carried out by sctoring equal samples of the conventional material and the novel composition of this example in closed containers, some at room temperature and some at 98° F. It is observed that, of the samples stored at the higher temperature, extreme enzyme deactivation, amounting to as much as 65–70%, occurs in times as short as 2 months in the soy flour constituent of the conventionally prepared compositions, while no undue enzyme deactivation occurs in storage periods of 6 months and even longer in the compositions prepared in accordance with the present example. Excessive enzyme deactivation is also observed in the conventionally prepared sample stored at room temperature. Further, with the conventionally prepared compositions, many of the stored samples show noticeable rancidity, developing in the fat content of the soy flour, well before the end of a 6-month storage period, while no such rancidity develops in the compositions prepared in accordance with the present example.

Test bakes of the composition of this example, carried out in the manner described in Example 1, both with freshly prepared materials and with the compositions stored for 6 months and longer, produce bread of superior quality showing the expected bread improver results from the three active bread improver constituents of the composition, namely, calcium peroxide, dicalcium phosphate and enzymatically active soy flour.

*Example 3*

Three hundred parts by weight of partially dextrinized corn flour, having an average particle size of about 80 mesh, is combined in a heated mixing device with 60 parts by weight of a distilled monoglyceride product (Myverol Type 18–05, produced by Distillation Products Industries, Rochester, New York) consisting essentially of glyceryl monostearate made from triple pressed stearic acid and having a minimum monoester content of 90%, an iodine value of approximately 3 and a congealing point of 66° C. Mixing is continued for 20 minutes with the mixer maintained at 60–66° C. As a separate operation, 60 parts by weight of the same glyceryl monostearate product is melted in a suitable mixing apparatus and 9 parts by weight of corn syrup is incorporated while the molten glyceryl monostearate is continually stirred. The resulting product is an emulsion in which the corn syrup is dispersed through the monostearate. The full quantity of this material is added to the preliminary corn flour-monostearate mixture, simultaneously with 300 parts by weight of food grade calcium peroxide (60% $CaO_2$, all finer than 100 mesh).

Mixing is continued for an additional 15 minutes with the temperature maintained near the melting point of the monostearate. The product is then cooled, while being continually mixed, in the manner described in Example 1. The finished product is of the general nature seen in the drawings, except that the protective coating 2 is relatively thicker and the outer portion thereof, instead of consisting of the monoglyceride product alone, has the highly water soluble corn syrup dispersed therethrough.

Baking tests with the product of this example show that, despite the relatively large amount of protective material employed, the calcium peroxide is released very quickly during the initial stages of dough mixing.

In considering the examples, it will be noted that it is not necessary to have the monoglyceride material fully molten, an adequate coating action being obtained so long as the monoglyceride material is brought to highly plastic state. It will be understood that the thickness of the protective covering supported by the core particles can be controlled by varying the relative proportions of carrier material and protective material. As the thickness of the layer of protective material increases, the amount of delay of the action of the bread improver agent is correspondingly increased. It should also be recognized that the various protective materials identified herein differ somewhat in the ease with which they can be emulsified. Thus, for example, the diacetyl tartaric acid esters of the monoglycerides emulsify more promptly than do the monoglyceride materials of Examples 1–3, so that the direct substitution of such esters in the formulations of the examples yields a product which acts in the dough after a shorter delay period.

I claim:

1. The method for preparing a bread improver material capable of exhibiting a delayed action during mixing of the dough to which it is added, comprising first uniformly mixing a particulate, solid, edible carrier material having an average particle size of 30–80 mesh with an initial amount of a normally solid, water-emulsifiable, edible protective material comprising as its predominant ingredient at least one material selected from the group consisting of monoglycerides having an iodine value not in excess of 50, mixed mono- and diglycerides having an iodine value not in excess of 50, the tartaric acid esters of mono- and diglycerides having an iodine value not in excess of 50, and normally solid mixtures of such materials with lecithin, while maintaining the mixture at an elevated temperature at least approaching the congealing point of said protective material, such mixing step causing said protective material to be spread in the form of continuous coatings over the surfaces of the particles of said carrier material, then introducing to the mixture a finely divided inorganic bread improver compound having an average particle size smaller than 100 mesh and an additional amount of such protective material and further mixing the same to establish on the particles of said carrier material thicker coatings of said protective material, in which coatings particles of said inorganic bread improver compound are enveloped, and then cooling the resulting product, while agitating the same, to cause said protective material to congeal, said protective material being employed in an amount equal to from 1/10 to 1/2 times the weight of said bread improver compound and said carrier material being employed in an amount equal to from 1/2 to 3 times the weight of said bread improver compound.

2. A particulate bread improver composition comprising a finely divided inorganic bread improver compound, an edible solid particulate carrier material in an amount from 1/2 to 3 times the weight of said inorganic compound, and a water-emulsifiable protective material having as its predominant ingredient at least one water-emulsifiable material selected from the group consisting of monoglycerides having an iodine value not in excess of 50, mixed mono- and diglycerides having an iodine value not in excess of 50, the tartaric acid esters of mono- and diglycerides having an iodine value not in excess of 50, and normally solid mixtures of such materials with lecithin, said protective material being employed in an amount equal to from 1/10 to 1/2 the weight of said inorganic compound and being present in the form of continuous coatings carried by the surfaces of the particles of said carrier materials and enveloping the same, the particles of said inorganic compound being carried by and enveloped in said coatings, said inorganic compound having an average particle size smaller than 100 mesh, said carrier material having an average particle size of 30–80 mesh.

3. A bread improver composition in accordance with claim 2 and wherein said carrier material is a cereal flour.

4. A bread improver composition in accordance with claim 3 wherein said inorganic compound is calcium peroxide, a major portion of said calcium peroxide being finer than 200 mesh.

5. A bread improver composition in accordance with claim 2 wherein said carrier material is partially dextrinized corn flour.

6. A particulate bread improver composition comprising (1) a particulate enzymatically active material and (2) a finely divided inorganic bread improver compound, an edible solid particulate carrier material in an amount from 1/2 to 3 times the weight of said inorganic compound, and a water-emulsifiable protective material having as its predominant ingredient at least one water-emulsifiable material selected from the group consisting of monoglycerides, having an iodine value not in excess of 50, mixed mono- and diglycerides having an iodine value not in excess of 50, the tartaric acid esters of mono- and diglycerides having an iodine value not in excess of 50, and normally solid mixtures of such materials with lecithin, said protective material being employed in an amount equal to from 1/10 to 1/2 the weight of said inorganic compound and being present in the form of continuous coatings carried by the surfaces of the particles of said carrier materials and enveloping the same, the particles of said inorganic compound being carried by and enveloped in said coatings, said inorganic compound having an average particle size smaller than 100 mesh, said carrier material being larger than the particles of said inorganic compound and having an average particle size of 30–80 mesh, the enzymatically active content of said enzymatically active material being sensitive to said inorganic bread improver compound, said coatings of protective material being effective to physically separate the particles of said enzymatically active material from the particles of said inorganic compound and thereby protect the enzymatically active content of said enzymatically active particles from damage as a result of presence of said inorganic compound, said coatings being capable of being taken up by the aqueous phase of a dough during mixing thereof.

7. A bread improver composition in accordance with claim 6 and wherein said inorganic compound is calcium peroxide.

8. A bread improver composition in accordance with claim 6 and wherein said inorganic compound is dicalcium phosphate.

9. A bread improver composition in accordance with claim 6 and wherein said enzymatically active material is a soy flour containing at least a substantial proportion of its natural fat content.

10. The method for preparing a particulate bread improver material capable of exhibiting delayed action during mixing of the dough to which it is added comprising uniformly mixing (1) a finely particulate inorganic bread improver compound having an average particle size smaller than 100 mesh, (2) a particulate, solid, edible carrier material in an amount from 1/2 to 3 times the weight of said inorganic compound, the particles of said carrier material being larger than the particles of said inorganic compound and having an average particle size of 30–80 mesh, and (3) a normally solid, water-emulsifiable edible protective material comprising as its predominant ingredient at least one water-emulsifiable material selected from the group consisting of monoglycerides having an iodine value not in excess of 50, mixed mono- and diglycerides having an iodine value not in excess of 50, the tartaric acid esters of mono- and diglycerides having an iodine value not in excess of 50, and normally solid mixtures of such materials with lecithin, while maintaining the mixture at an elevated temperature to cause said protective material to assume at least a highly plastic state, said protective material being employed in an amount equal to from 1/10 to 1/2 the weight of said inorganic compound said mixing step causing said protective material to form continuous coatings on the particles of said carrier material with the fine particles of said inorganic compound being enveloped in such coatings, and then cooling the product, while continuing said mixing step, to cause said protective material to congeal.

11. The method of claim 10 wherein said carrier material is a cereal flour and a predominant proportion of said inorganic compound is finer than 200 mesh.

12. The method of claim 10 wherein said carrier material is a corn flour and said inorganic compound is calcium peroxide, a predominant proportion of said calcium peroxide being finer than 200 mesh.

13. The method of claim 1 wherein said carrier material is a cereal flour and said inorganic compound is calcium peroxide, a predominant proportion of said calcium peroxide having a particle size smaller than 200 mesh.

References Cited in the file of this patent

UNITED STATES PATENTS

| | | |
|---|---|---|
| 2,067,912 | Frey et al. | Jan. 19, 1937 |
| 2,132,436 | Reynolds et al. | Oct. 11, 1938 |
| 2,185,368 | Bowen | Jan. 2, 1940 |
| 2,288,410 | Lippman | June 30, 1940 |
| 2,321,673 | Hall | June 15, 1943 |
| 2,736,654 | Selman et al. | Feb. 28, 1956 |

OTHER REFERENCES

"Chemicals by Glyco," 1944, Glyco Products Co., Inc. (Brooklyn, N.Y.), p. 33 (Modified Polyhydric Alcohol Esters-Glyceryl Monostearate S).

"Chemicals by Glyco," 1944, Glyco Products Co., Inc. (Brooklyn, N.Y.), p. 35.

Soybeans and Soybean Products, 1950, by Markley, Interscience Publishers Inc. (N.Y), p. 284.